United States Patent
Kawamura et al.

(10) Patent No.: US 6,801,844 B2
(45) Date of Patent: Oct. 5, 2004

(54) SHIFT CONTROL SYSTEM OF CONTINUOUSLY VARIABLE TRANSMISSION

(75) Inventors: Yasutaka Kawamura, Kanagawa (JP); Shigeki Shimanaka, Kanagawa (JP); Masaki Watanabe, Tokyo (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/327,662

(22) Filed: Dec. 24, 2002

(65) Prior Publication Data

US 2003/0135316 A1 Jul. 17, 2003

(30) Foreign Application Priority Data

Dec. 28, 2001 (JP) ........................ 2001-399340

(51) Int. Cl.⁷ .................... F16H 61/30; F16H 13/10
(52) U.S. Cl. .................. 701/51; 477/156; 477/901; 123/399
(58) Field of Search ................. 701/51, 54; 477/37, 477/109, 115, 906, 98, 156, 901; 123/399; 188/77 R; 476/41

(56) References Cited

U.S. PATENT DOCUMENTS

| | | | |
|---|---|---|---|
| 6,312,357 B1 * | 11/2001 | Sakai et al. | 477/37 |
| 2001/0018383 A1 * | 8/2001 | Sugihara et al. | 476/41 |
| 2001/0044359 A1 * | 11/2001 | Saito et al. | 477/92 |
| 2001/0056320 A1 * | 12/2001 | Kato et al. | 701/51 |
| 2002/0011792 A1 * | 1/2002 | Taniguchi et al. | 315/76 |
| 2002/0042326 A1 * | 4/2002 | Rosi et al. | 477/156 |
| 2002/0082760 A1 * | 6/2002 | Katakura et al. | 701/54 |

FOREIGN PATENT DOCUMENTS

| | | | |
|---|---|---|---|
| JP | 02001099295 A | * | 4/2001 |
| JP | 2001-132827 A | | 5/2001 |
| JP | 02001200904 A | * | 7/2001 |

OTHER PUBLICATIONS

U.S. patent application Ser. No. 10/327,661, Watanabe et al., filed Dec. 24, 2002.

* cited by examiner

*Primary Examiner*—Thomas G. Black
*Assistant Examiner*—Tuan C To
(74) *Attorney, Agent, or Firm*—Foley & Lardner LLP

(57) ABSTRACT

A shift control system of a toroidal CVT for a vehicle is arranged to calculate a command gear ratio by adding a desired gear ratio and a torque shift compensation quantity for compensating a difference between the desired gear ratio and an actual gear ratio which difference is generated by a shifting operation of the toroidal CVT, and to set a magnitude of the torque shift compensation quantity employed in an automatic shift range to be larger than a magnitude of the torque shift compensation quantity employed in other shift range except for the automatic shift range when the actual gear ratio is in a first gear ratio region except for a second gear ratio region including a largest gear ratio.

11 Claims, 12 Drawing Sheets

SHIFT CONTROL SYSTEM OF CONTINUOUSLY VARIABLE TRANSMISSION

BACKGROUND OF THE INVENTION

The present invention relates to a shift control system having a function for compensating a torque shift specifically generated by a shift operation of a toroidal continuously variable transmission.

Japanese Patent Provisional Publication No. 2001-132827 discloses a torque shift compensation apparatus of a toroidal continuously variable transmission, which apparatus is arranged to compensate a torque shift by controlling a shift control device based on a command gear ratio obtained by adding a desired gear ratio and a torque shift compensation quantity generated at a high-speed side gear ratio. This disclosed apparatus employs one map of the torque shift compensation quantity relative to a transmission input torque and a gear ratio. When one kind of the torque shift compensation quantity is employed as this case, it is common that the torque shift compensation quantity is set so that the compensation of the torque shift is smooth executed in an automatic shift range which is mainly used in the shift ranges.

SUMMARY OF THE INVENTION

However, if the torque shift compensation quantity is set to preferably perform in automatic shift range (D-range) although there is a fact that the torque shift compensation quantity varies according to a selected shift range selected from D-range range, other ranges or manual shift mode (M-mode), the torque shift compensation quantity in the other range or the manual mode tends to take excessively large value so that the actual gear ratio deviates from the desired gear ratio.

It is an object of the present invention to provide an improved shift control system which has a function of compensating a torque shift of a toroidal continuously variable transmission according to a selected shift range so as to certainly adjust an actual gear ratio at a desired gear ratio when a shift operation is terminated.

An aspect of the present invention resides in a shift control system of a toroidal continuously variable transmission (toroidal CVT) for a vehicle. The shift control system comprises a controller which is configured to calculate a command gear ratio by adding a desired gear ratio and a torque shift compensation quantity for compensating a difference between the desired gear ratio and an actual gear ratio which difference is generated by a shifting operation of the toroidal CVT, and to set a magnitude of the torque shift compensation quantity employed in an automatic shift range to be larger than a magnitude of the torque shift compensation quantity employed in other shift range except for the automatic shift range when the actual gear ratio is in a first gear ratio region except for a second gear ratio region including a largest gear ratio.

Another aspect of the present invention resides in a method of setting a torque shift compensation quantity employed for compensating a difference between a desired gear ratio and an actual gear ratio which difference is generated by a shifting operation of a toroidal continuously variable transmission (toroidal CVT) for a vehicle, the method comprising the steps of: calculating a command gear ratio by adding the desired gear ratio and the torque shift compensation quantity; and setting a magnitude of the torque shift compensation quantity employed in an automatic shift range to be larger than a magnitude of the torque shift compensation quantity employed in other shift range except for the automatic shift range when the actual gear ratio is in a first gear ratio region except for a second gear ratio region including a largest gear ratio.

The other objects and features of this invention will become understood from the following description with reference to the accompanying drawings.

DETAILED DESCRIPTION OF THE INVENTION

Hereafter, there will be explained an embodiment of the present invention in detail with reference to the drawings.

Figure 1:
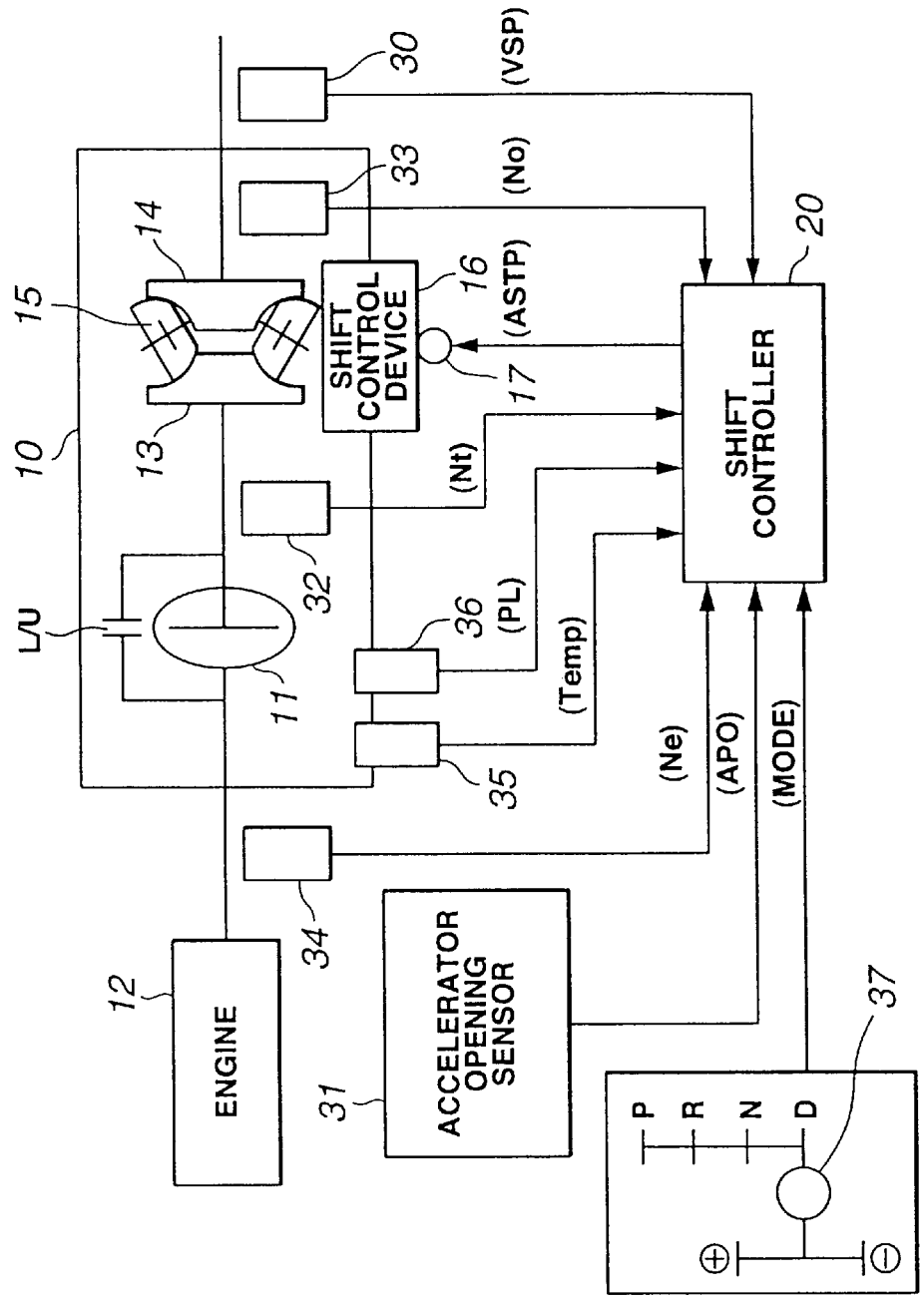
FIG. 1 is a schematic view showing a shift control system of a toroidal continuously variable transmission having a torque shift compensation function in accordance with an embodiment of the present invention.

FIG. 1 shows a shift control system of a toroidal continuously variable transmission (toroidal CVT) 10 which system is equipped with a shift control system of an embodiment according to the present invention. The toroidal CVT 10 is for a vehicle and comprises an input disc(s) 13 which receives a rotation force generated by an internal combustion engine 12 through a torque converter 11 having a lockup clutch L/U, an output disc(s) 14 coaxial with input disc 13, and power rollers 15 clamped by input and output discs 13 and 14.

A power transmission between the input and output discs 13 and 14 through the power rollers 15 is achieved by a shearing stress of an oil film formed between the power rollers 15 and the input and output discs 13 and 14.

A shift operation of the toroidal CVT 10 is executed by the operation of a power-roller supporting member (not shown and so-called a trunnion) and a piston-type servo mechanism (not shown). More specifically, the power roller 15 is moved from a neutral range, which is an intersection between a rotation axis of the power roller 15 and a rotation axis of the input and output discs 13 and 14, along a direction of an inclination axis on which the power roller 15 is inclined and which is perpendicular to the rotation axis of the power roller 15. This direction of the inclination axis is perpendicular to a plane of a paper on which FIG. 1 is shown.

With this arrangement, the power roller 15 is capable of being inclined on the inclination axis together with the power-roller supporting member by a component of the rotational force. Accordingly, the gear ratio of the toroidal CVT 10 is continuously varied according to this continuous variation of an arc radius of a contact locus of each power roller 15 relative to input and output discs 13 and 14.

The movement of the power roller 15 along the inclination axis is achieved by operating a shift actuator (stepper motor) 17 of a shift control device 16 in response to a stepper motor command (ATSP) corresponding to a desired gear ratio. By executing a feedback of a proceeding state of a shift operation through a mechanical feedback system (not shown), the power roller 15 is returned to the neutral range when an actual gear ratio reaches the desired gear ratio, and the desired gear ratio is maintained.

The power rollers 15 receive the force directed toward a thrown-out direction along which the power roller 15 is thrown out of the input and output discs 13 and 14 since the power roller 15 is clamped by the input and output discs 13 and 14 with a thrust force according to the transmission input torque, and therefore the power roller supporting member are slightly deformed by this pressing force. Such a deformation of the power roller supporting members mainly acts as a disturbance of a mechanical feedback system. Due to this input of the disturbance to the mechanical feedback system causes a disaccord between the actual gear ratio and the desired gear ratio of the toroidal CVT 10 after a shifting. This difference between the actual gear ratio and the desired gear ratio is a torque shift.

In order to determine the motor command value ASTP, which is determined taking account of the torque shift, the shift controller 20 receives various signals. The signal includes a signal sent from a vehicle speed sensor 30 for detecting a vehicle speed VSP, a signal sent from an accelerator opening sensor 31 for detecting a depression quantity of an accelerator pedal, a signal sent form an input rotation speed sensor 32 for detecting a turbine speed Nt (transmission input rotation speed), a signal sent from an engine speed sensor 34 for detecting an engine rotation speed Ne, a signal sent from an oil temperature sensor 35 for detecting an operation temperature Temp of transmission working fluid, a MODE signal sent from a line pressure sensor 36 for detecting a line pressure PL indicative of a base pressure of a shift control, and a signal outputted from a shift lever 37 manipulated by a driver to select a desired shift mode and range.

As shown in FIG. 1, a shift lever 37 is capable of taking a parking range denoted by P, a reverse running range denoted by R, a neutral range denoted by N, an automatic shift range (automatic shift mode) denoted by D, and a manual shift range denoted by M. Parking range (P-position), reverse range (R-position), neutral range (N-position) and automatic drive range (D-range) are arranged inline, and manual mode range (M-mode) is arranged at a side of the D-range. When the shift lever 37 is set at one of these selectable ranges, a signal indicative of corresponding range and/or mode is outputted.

When the manual shift mode (M-mode) is selected, the shift lever 37 is returnably positioned at an intermediate position between an upshift range (+) and a downshift range (−). An upshift command is outputted by every driver's tilting operation of the shift lever 37 toward upshift range (+), and a downshift command is outputted by every driver's tilting operation of the shift lever 37 toward downshift range (−).

Figure 2:
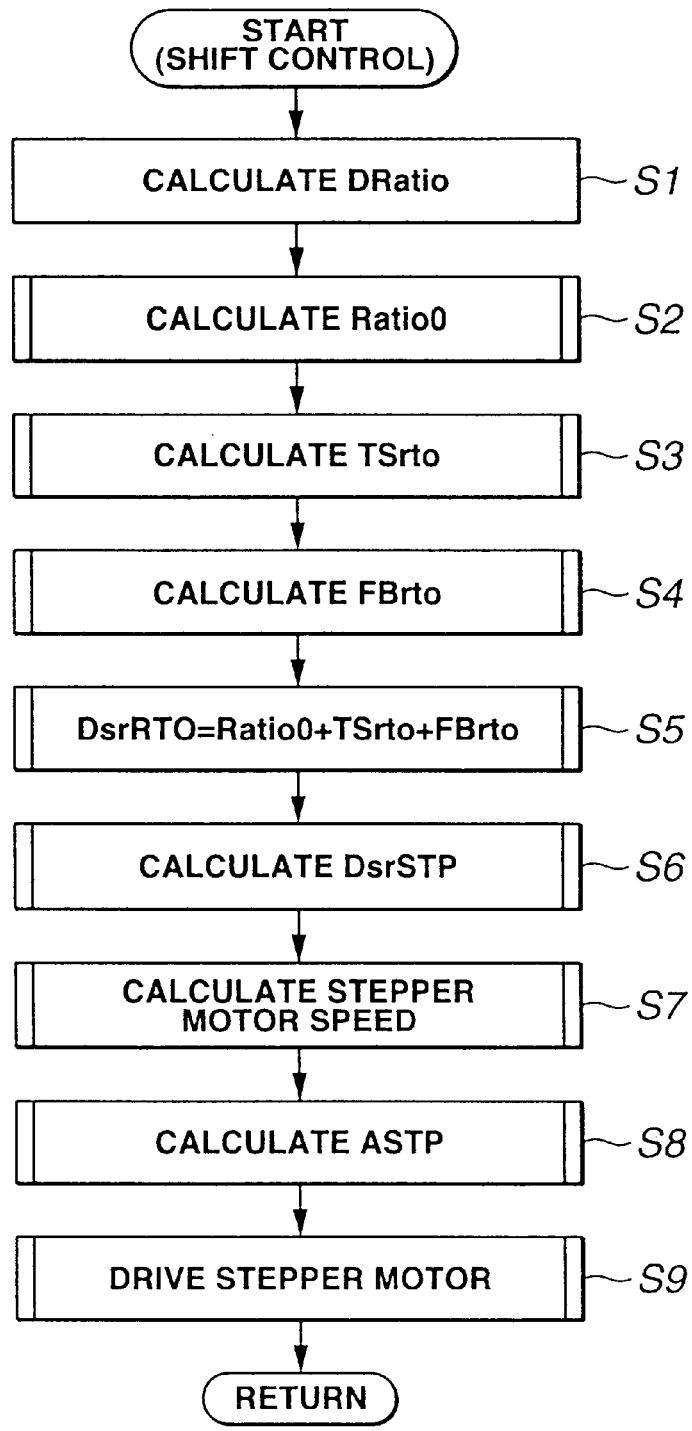
FIG. 2 is a flowchart showing a main routine of a shift control executed by a shift controller in FIG. 1.

The shift controller 20 determines the stepper motor command value ASTP by executing a control program of FIG. 2 on the basis of the input information. Further the shift controller 20 outputs the stepper motor command value ASTP to the stepper motor 17 of the shift control device 16 so that the toroidal CVT 10 executes a determined shift operation.

The program of FIG. 2 is a timer interruption routine and is executed at 10 msec intervals.

Figure 9:
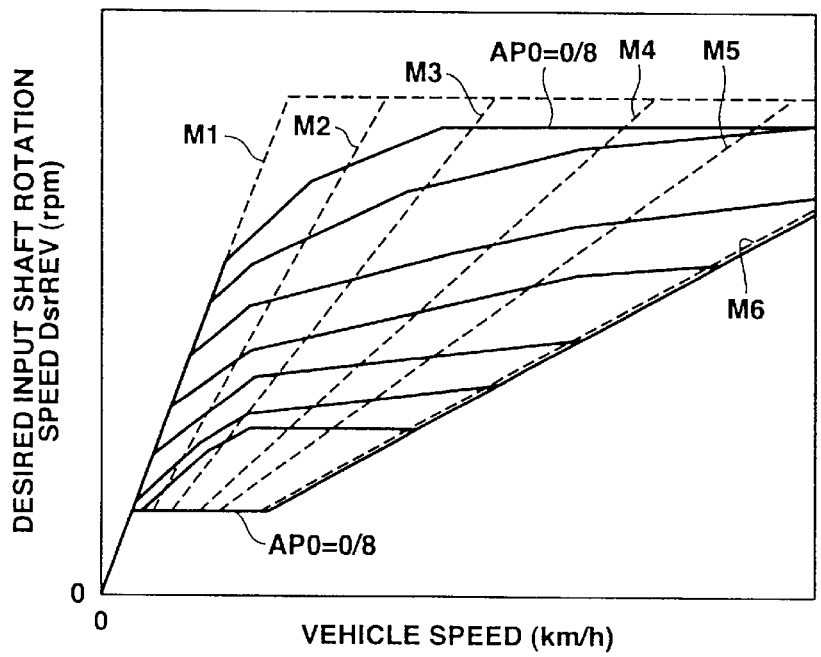
FIG. 9 is a graph showing a shift pattern of the toroidal continuously variable transmission.

At step S1 the shift controller 20 calculates a desired input rotation speed DsrREV from the accelerator depression quantity APO and the vehicle speed VSP using a shift map shown in FIG. 9. Further, the controller 20 calculates an attainable gear ratio DRatio by dividing the desired input rotation speed DsrREV by the transmission output speed No. The attainable gear ratio DRatio is an aimed gear ratio to be finally reached.

More specifically, when D-range is selected, the desired input rotation speed DsrREV is obtained from the accelerator pedal depression quantity APO and the vehicle speed VSP and on the basis of an automatic shift characteristic line denoted by a continuous line corresponding to the respective accelerator pedal depression quantity APO in FIG. 9. Further, the attainable gear ratio DRatio is obtained by dividing the desired input rotation speed DsrREV by transmission output rotation speed No. When M-mode is selected, the desired input rotation speed DsrREV is obtained from the vehicle speed VSP on the basis of a selected shift characteristic line corresponding to the selected gear ratio. This selected shift characteristic line is one of the manual shift characteristic lines corresponding to the manual first speed M1 through manual sixth speed M6 denoted by broken lines in FIG. 9. Further, the attainable gear ratio DRatio is obtained by dividing the desired input rotation speed DsrREV by the transmission output rotation speed No.

At step S2 the controller 20 calculates a desired gear ratio Ratio0 which is a transient value varied every control cycles and which is employed for executing a shift operation from an actual gear ratio Ratio to attainable gear ratio DRatio with a predetermined shift response. The actual gear ratio Ratio (Ratio=Nt/No) is obtained by dividing the input rotation speed Nt by the output rotation speed No of the toroidal CVT 10.

Figure 3:
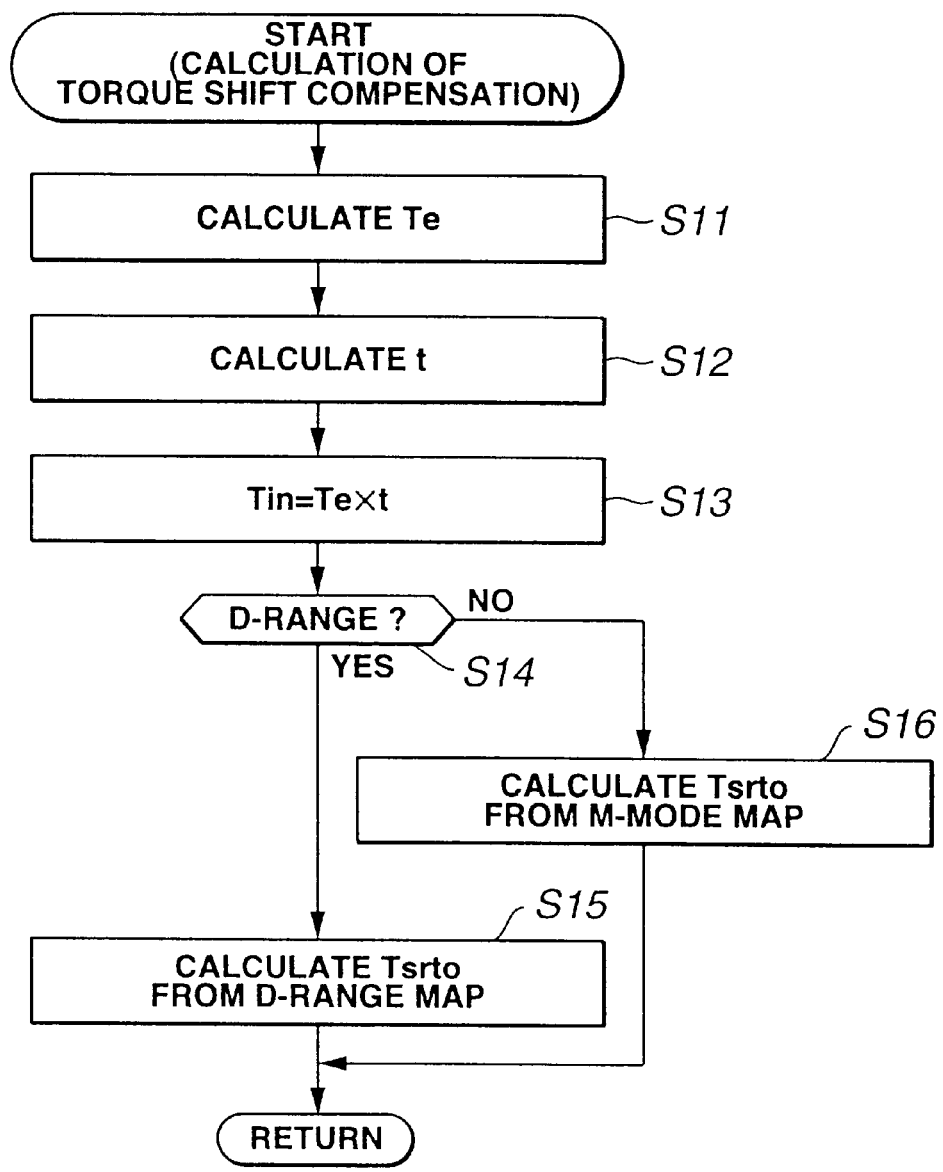
FIG. 3 is a flowchart showing a subroutine for calculating a torque shift compensation quantity in the main routine.

At step S3 the controller 20 calculates a torque shift compensation quantity TSrto by executing a processing shown in FIG. 3.

In the processing of FIG. 3, at step S11 the controller 20 estimates an engine torque Te from the engine speed Ne and the accelerator pedal depression quantity APO using a map stored in the controller 20.

At step S12 the controller 20 obtains a torque ratio t of the torque converter 11 from the engine speed Ne and the input rotation speed Nt on the basis of a map or table stored in the controller 20.

At step S13 the controller 20 obtains a transmission input torque Tin by multiplying the engine torque Te and the torque ratio t.

At step S14 the controller 20 determines whether D-range is selected or not, on the basis of the MODE signal. When the determination at step S14 is affirmative (D-range), the routine proceeds to step S15 wherein the controller 20 calculates the torque shift compensation quantity TSrto from the transmission input torque Tin and a previous value (actual gear ratio) of the desired gear ratio Ratio0 and on the basis of a D-range torque shift compensation map denoted by a continuous line in FIG. 10 in case that the transmission input torque Tin is 280 Nm.

Figure 10:
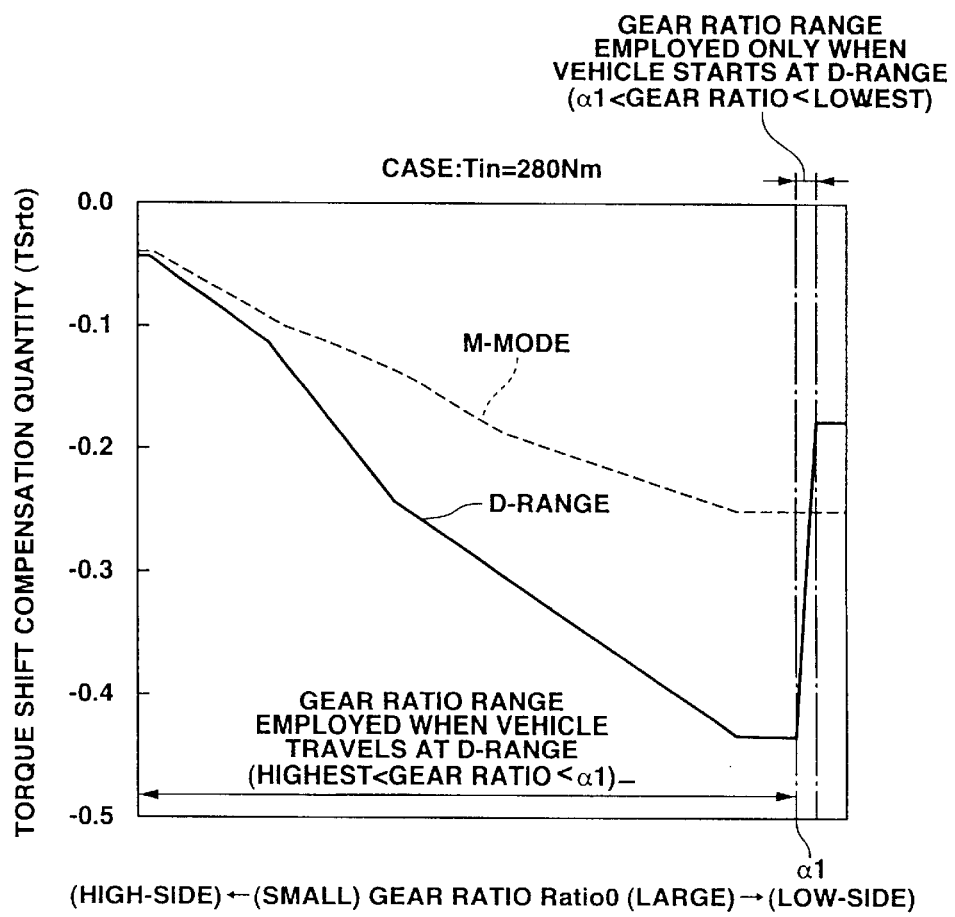
FIG. 10 is a graph showing a relationship between the gear ratio and the torque shift compensation quantity under a transmission input torque constant condition by each shift mode.

When the determination at step S14 is negative (selected range is not D-range), the routine proceeds to step S16 wherein the controller 20 calculates the torque shift compensation quantity TSrto from the transmission input torque Tin and the previous value of desired gear ratio Ratio0 on the basis of a M-mode torque shift compensation quantity map denoted by a broken line in FIG. 10 in case that transmission input torque Tin is 280 Nm.

The torque shift compensation quantity TSrto is employed for correcting the desired gear ratio toward a high-speed side, that is, toward a direction for decreasing the desired gear ratio. Hereinafter, the gear ratio in the high-speed side is called a high-side gear ratio which corresponds to a small gear ratio, and the gear ratio in the low-speed side is called a low-side gear ratio which corresponds to a large gear ratio.

Accordingly, as shown in FIG. 10, the torque shift compensation quantity TSrto takes a negative value, and when the absolute value (magnitude) of the torque shift compensation quantity TSrto is large, it is called that the torque shift compensation quantity is large throughout the this specification.

There will be supplementally discussed a characteristic of the torque shift compensation quantity TSrto shown in FIG. 10.

FIG. 10 shows the characteristic of torque shift compensation TSrto when the toroidal CVT 10 is set at D-range and except for starting period and when it is forbidden to select a gear ratio close to the lowest side gear ratio larger than a gear ratio denoted by Ratio0=$\alpha$1 in FIG. 10. Accordingly, when the gear ratio is in a gear-ratio region smaller than the ratio Ratio0=$\alpha$1, that is, when in a high-side gear ratio region except for a gear ratio close to the lowest side gear ratio, the torque shift compensation quantity in M-mode is set at a value smaller than the torque shift compensation quantity in D-range. Although the difference between the torque shift compensation quantities in M-mode and D-range is increased as the gear ratio Ratio0 is varied to the low-side gear ratio, the torque shift compensation quantity in D-range is decreased when the gear ratio is in a gear ratio region close to the lowest-side gear ratio (largest gear ratio).

Hereinafter, there will be discussed why the torque shift compensation quantity in D-range is decreased when the gear ratio is in the gear-ratio region close to the lowest-side (largest) gear ratio.

When the gear ratio of toroidal CVT 10 takes a value close to the lowest-side gear ratio, a feedback gain of the mechanical feedback system is set to take a larger value in order to prevent the power-roller supporting member from colliding with a tilt stopper. If the torque shift compensation quantity is set at a large value in addition to the large value setting of the feedback gain in the lowest-side gear-ratio region, it causes a possibility that the toroidal CVT 10 cannot take the lowest-side gear ratio. Therefore, in order to prevent such a problem as to selecting the lowest-side gear ratio, the torque shift compensation quantity in D-range is decreased when the gear ratio is close to the lowest-side gear ratio.

However, if this arrangement as to the decrease of the torque shift compensation quantity is executed, it causes a strange feeling due to a step between the D-range torque shift compensation quantity in the gear-ratio region close to the lowest-side gear ratio and the D-range torque shift compensation quantity in the high-side gear ratio except for the lowest gear-ratio region. Accordingly, in order to prevent the generation of such strange feeling, it is prohibited to select the gear ratio close to the low-side gear ratio larger than the gear ratio denoted by Ratio0=$\alpha$1 in FIG. 10, when toroidal CVT takes D-range except for starting the vehicle.

Figure 11:
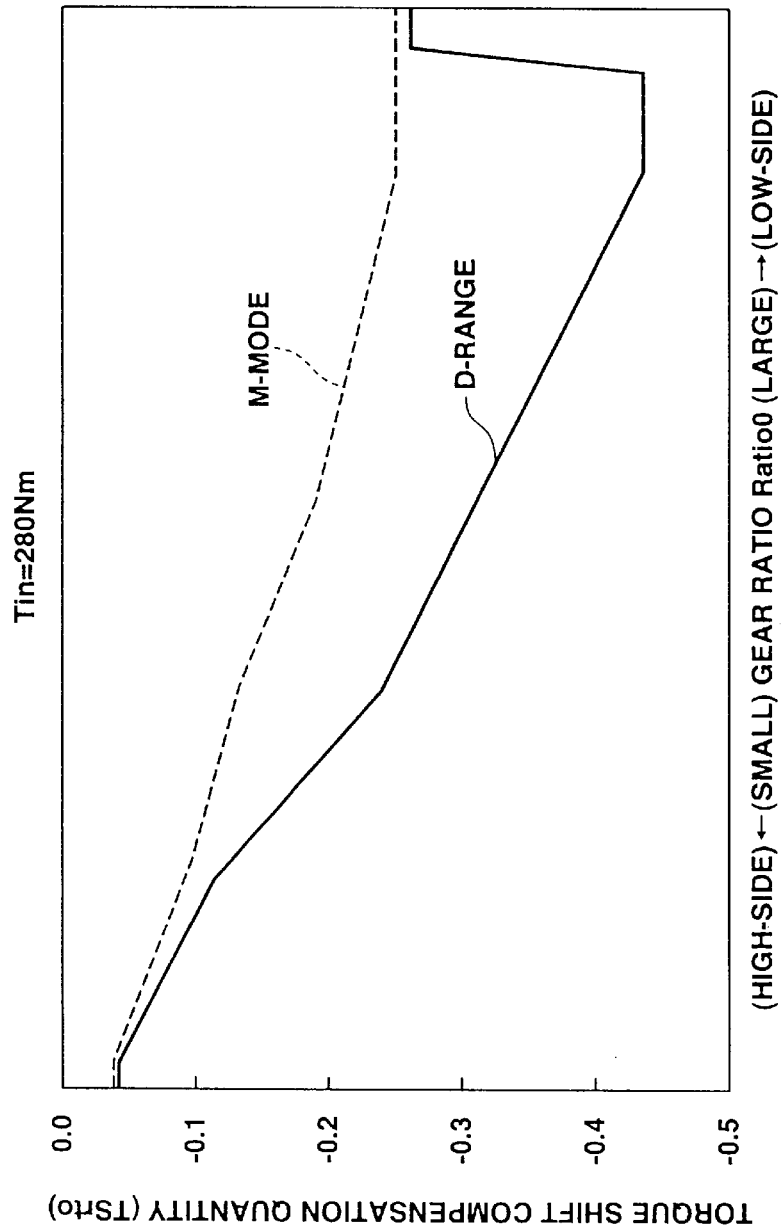
FIG. 11 is a graph showing a relationship between the gear ratio and the torque shift compensation quantity of another type toroidal continuously variable transmission under a transmission input torque constant condition by each shift mode.

In case that the toroidal CVT 10 is arranged to allow selecting all gear ratios including the lowest-side gear ratio when D-range is selected and even when the vehicle is in a situation except for the vehicle starting situation, a map shown in FIG. 11 is employed instead of that shown in FIG. 10 to obtained the torque shift compensation quantity TSrto.

As is apparent from FIG. 11, in case that the toroidal CVT 10 is allowed to take all gear ratio in D-range, the torque shift compensation quantity in M-mode is set smaller than that in D-range throughout the whole gear ratio region which includes the lowest-side gear ratio region smaller than Ratio0=$\alpha$1 and the high-side gear ratio region except for the lowest-side gear ratio region. Although the difference between the torque shift compensation quantities in M-mode and D-range is increased as the gear ratio Ratio0 is varied toward the low-side gear ratio, the torque shift compensation quantity in D-range is decreased when the gear ratio is in a gear ratio region close to the lowest-side gear ratio in order to avoid the toroidal CVT 10 from being disable to select the lowest side gear ratio. As is similar to FIG. 10, when the absolute value of the torque shift compensation quantity TSrto is large, it is called that the torque shift compensation quantity is large throughout the this specification.

In FIGS. 10 and 11, continuous lines denote the characteristic of the torque-shift compensation quantity in D-range and broken lines denote the characteristic of the torque-shift compensation quantity in M-mode, in case that transmission input torque Tin is 280 Nm.

Figure 12:
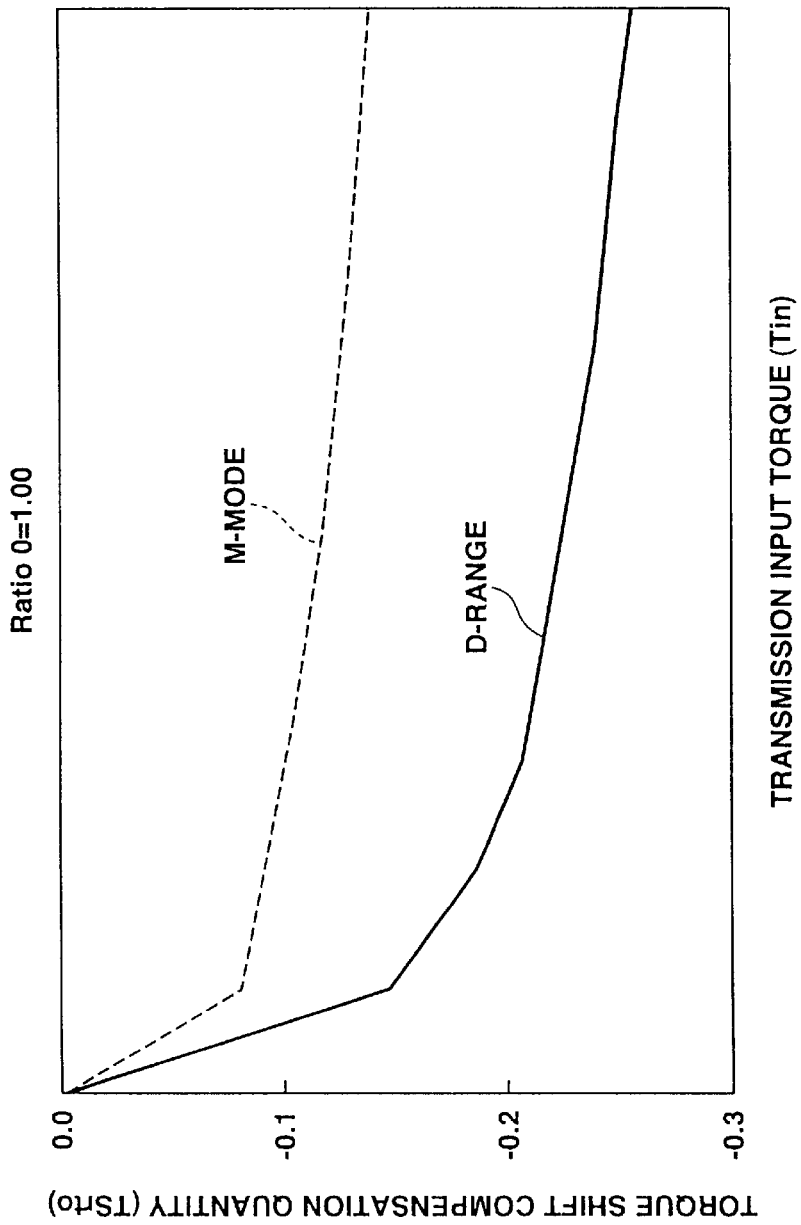
FIG. 12 is a graph showing a relationship between the transmission input torque and the torque shift compensation quantity under a gear ratio constant condition by each shift mode.

In contrast, in case that gear ratio Ratio0 is set at 1.00, a difference between the torque shift compensation quantities in D-range and M-mode is increased as the transmission input torque Tin increases, as shown in FIG. 12. In FIG. 12, a continuous line denotes the characteristic of the torque shift compensation quantity in D-range, and a broken line denotes the characteristic of the torque shift compensation quantity in M-mode.

At step S4 in FIG. 2 subsequent to the execution of step S2 wherein torque-shift compensation quantity Tsrto is calculated in a manner of executing the program of FIG. 3, the controller 20 calculates a deviation between the desired gear ratio Ratio0 obtained at step S2 and the actual gear ratio Ratio (Ratio=Nt/No) obtained by dividing the input rotation speed Nt by the output rotation speed No of CVT 10. Further the controller 20 calculates a feedback compensation quantity FBrto by means of the PID control (Proportional Integral, Integral control and Differential control) based on the feedback gain and according to the operating condition of the toroidal CVT 10. As is apparent form the definition of the actual gear ratio Ratio, the gear ratio is commonly decreased according to the increase of the vehicle speed. Therefore, a high-side gear ratio commonly employed in the high-speed vehicle traveling corresponds to a small gear ratio, and a low-side gear ratio commonly employed in the low-speed vehicle traveling corresponds to a large gear ratio.

Figure 4:
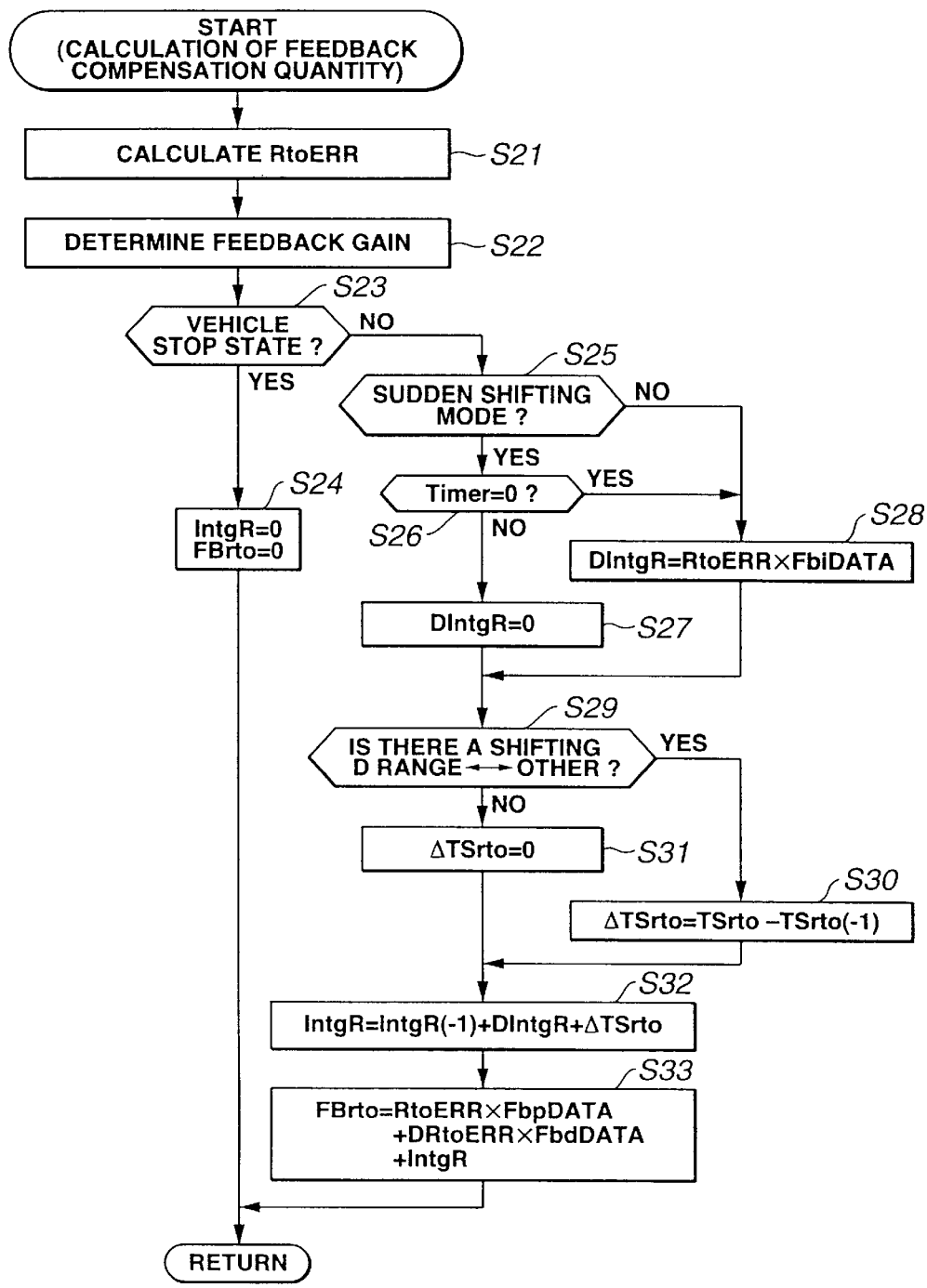
FIG. 4 is a flowchart showing a subroutine for calculating a feedback compensation quantity in the main routine.

More specifically, at step S4 in FIG. 2, a routine shown in FIG. 4 is executed as follows. At step S21 the controller 20 calculates a gear ratio deviation RtoERR between the desired gear ratio Ratio0 and the actual gear ratio Ratio. At step S22 the controller 20 determines the feedback gain employed in the PID control according to the operating condition of the toroidal CVT 10.

Figure 5:
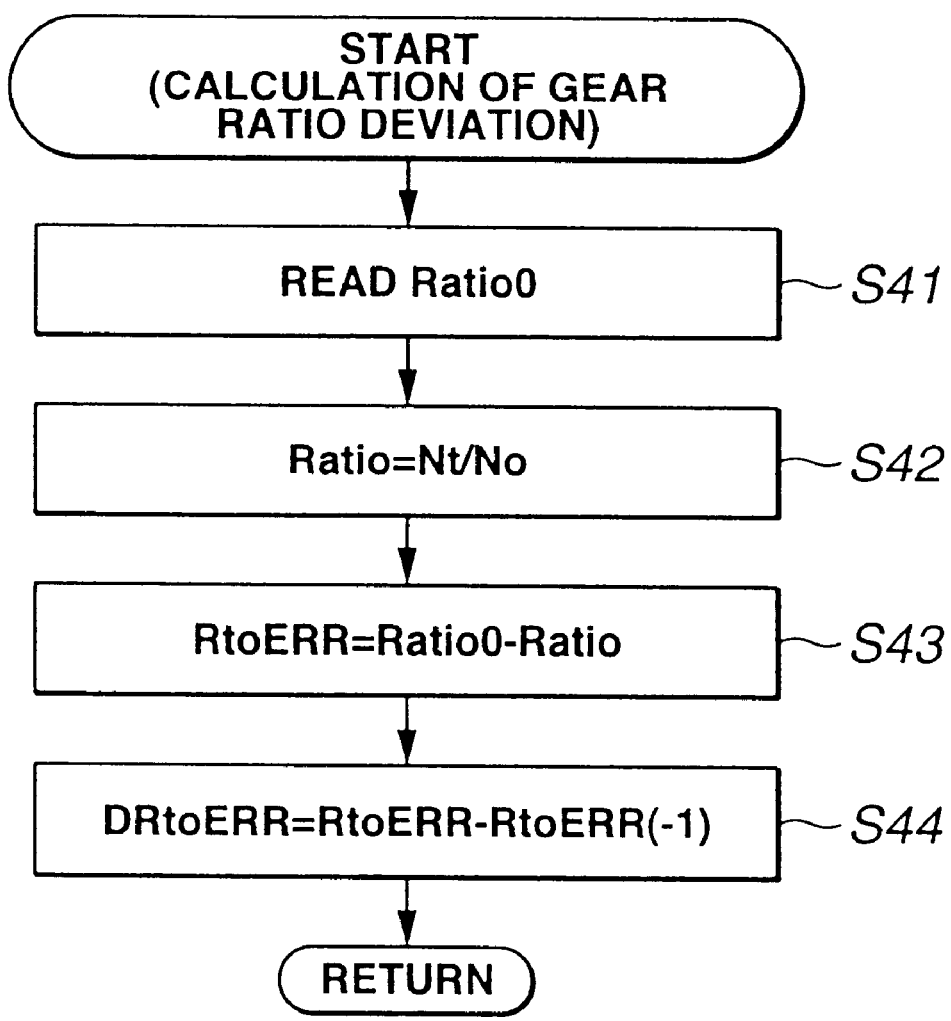
FIG. 5 is a flowchart showing a subroutine for calculating a gear ratio deviation in the feedback compensation quantity calculation program.

FIG. 5 shows a calculation processing executed at step S21 of FIG. 4. At step S41 in FIG. 5 the controller 20 reads the desired gear ratio Ratio0. At step S42 the controller 20 calculates the actual gear ratio Ratio (Ratio=Nt/No). At step S43 controller 20 calculates the gear ratio deviation RtoERR (RtoERR=Ratio0−Ratio). At step S44 the controller 20 calculates a deviation change DRtoERR=RtoERR−RtoErr (−1) from the present gear ratio deviation RtoERR and the previous gear ratio deviation RtoERR(−1).

Figure 6:
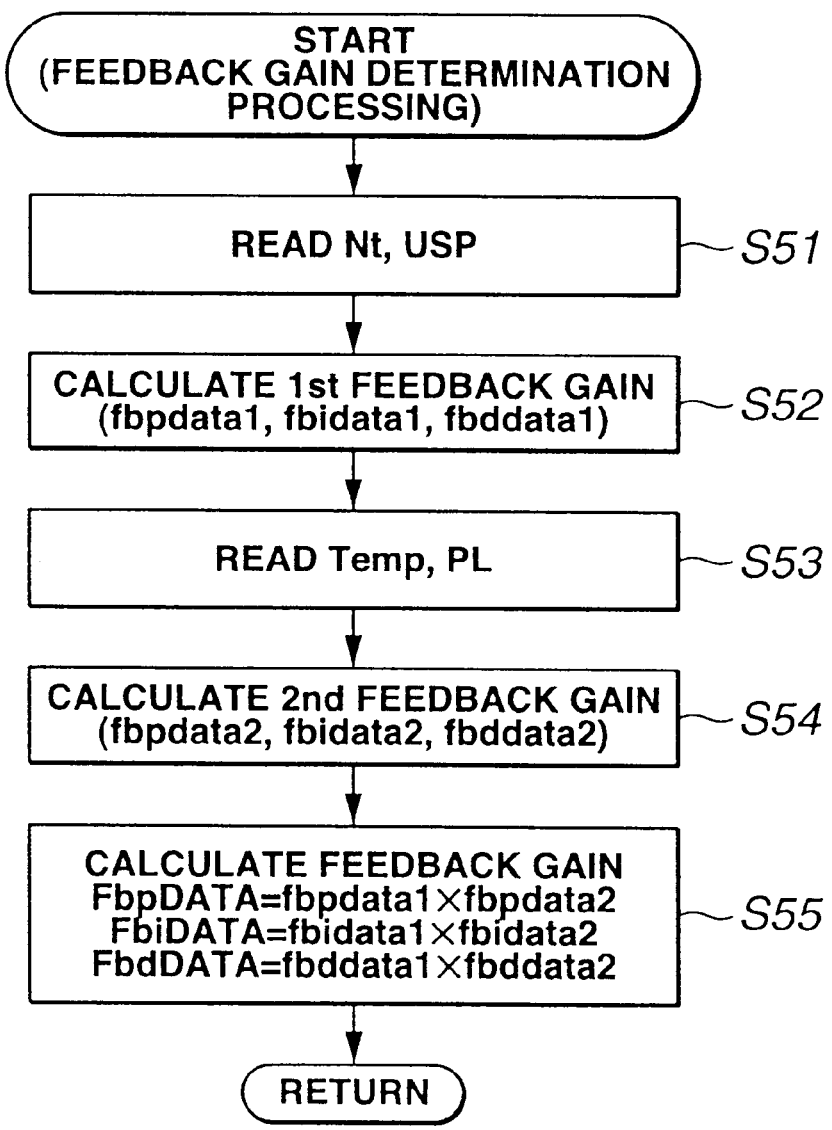
FIG. 6 is a flowchart showing a feedback gain determination processing in the feedback compensation quantity calculation program.

FIG. 6 shows a feedback-gain determination processing executed at step S22 of FIG. 4. At step S51 in the flowchart of FIG. 6, the controller 20 reads the input rotation speed Nt and the vehicle speed VSP. At step S52 the controller 20 obtains a first feedback gain, which includes a first proportional gain fbpdata1 for the proportional control, a first integral gain fbidata1 for the integral control and a first differential gain fbddata1 for the differential control, on the basis of a table SRFBT1 (not shown) stored in the controller 20 and from the input rotation speed Nt and the vehicle speed VSP.

At step S53 the controller 20 reads the oil temperature Temp and the line pressure PL. At step S54 the controller 20 obtains a second feedback gain, which includes a second proportional gain fbpdata2 for the proportional control, a second integral gain fbidata2 for the integral control and a second differential gain fbddata2 for the differential control, on the basis of a table SRFBT2 (not shown) stored in the controller 20 from the oil temperature Temp and the line pressure PL.

At step S55 the controller 20 obtains a final feedback gain employed in the calculation of a feedback compensation quantity Fbrto by multiplying the first feedback gain and the second feedback gain. More specifically, a proportional feedback gain FbpDATA is calculated by multiplying the first and second proportional gains fbpdata1 and fbpdata2 (FbpDATA=fbpdata1×fbpdata2), an integral feedback gain FbiDATA is calculated by multiplying the first and second integral gains fbidata1 and fbidata2 (FbiDATA=fbidata1× fbidata2), and a differential feedback gain FbdDATA is calculated by multiplying the first and second differential gains fbddata1 and fbddata2 (FbdDATA=fbddata1× fbddata2).

At step S23 subsequent to the determination processing of the feedback gain, the controller 20 determines whether or not the vehicle is put in a stop state by determining whether or not the vehicle speed VSP is zero, or whether or not the input rotation speed Nt is zero. When the determination at step S23 is affirmative, the routine proceeds to step S24 wherein the controller 20 resets an integral control feedback compensation quantity IntgR and the final feedback compensation quantity FBrto (IntgR=0 and Fbrto=0).

When the determination at step S23 is negative, the routine proceeds to step S25 wherein the controller 20 determines whether or not a sudden shifting is being executed. When the determination at step S23 is affirmative (sudden shifting), the routine proceeds to step S26. When the determination at step S25 is negative, the routine proceeds to step S28. The determination of the sudden shifting is executed on the basis of a determination result as to a time constant determined so as to correspond to the shift response obtained at step S2. When the gear-ratio deviation between the attainable gear ratio DRatio and the desired gear ratio Ratio0 (or actual gear ratio Ratio) increased by the depression or releasing of the accelerator pedal or by the execution of a kick-down down-shift or an up-shift due to throttle opening decrease is executed, the controller 20 determines that sudden shifting is being executed.

At step S26 subsequent to the affirmative determination at step S25, the controller 20 determines whether or not a timer Timer reaches zero. A setting method of this timer Timer will be discussed later with reference to FIG. 7, and a measurement method of this timer Timer will be discussed later with reference to FIG. 8. When the determination at step S26 is negative, that is, until timer Timer reaches zero, the routine proceeds to step S27 wherein a change DIntgR of the feedback compensation quantity IntgR by the integral control is set at zero to keep the feedback compensation quantity IntgR by the integral control at the previous value (DIntgR= 0). This arrangement avoids inappropriate increase of the feedback compensation quantity IntgR by the integral control.

At step S28 subsequent to the negative determination at step S25 (not sudden shifting) or the affirmative determination at step S26 (Timer=0), the controller 20 calculates the change DIntgR of the feedback compensation quantity by the integral control, by multiplying the gear ratio deviation RtoERR obtained at step S43 in FIG. 5 and the feedback gain FbiDATA for the integral control obtained at step S55 in FIG. 6, in order to execute a normal feedback compensation using the PID control for the purpose of returning the shift control to the normal control.

At step S29 subsequent to the execution of step S27 or S28, the controller 20 determines whether or not there is executed a shifting from D-range to other range or from other range to D-range. When the determination at step S29 is affirmative, the routine proceeds to step S30 wherein the controller 20 once calculates a difference ΔTSrto between the present torque-shift compensation quantity TSrto and the previous torque-shift quantity TSrto(−1). When the determination at step S29 is negative, the routine proceeds to step S31 wherein the difference ΔTSrto is kept at zero (ΔTSrto= 0).

At step S32 the controller 20 calculates the feedback compensation quantity IntegR of the integral control by adding the previous feedback compensation quantity IntgR (−1) of the integral control, the change DIntgR of the feedback compensation quantity of the integral control and the difference ΔTSrto obtained at step S30 or S31 (IntegR= IngegR(−1)+DIntgR+ΔTSrto).

At step S33 the controller 20 calculates the feedback compensation quantity FBrto from the gear ratio deviation RtoERR, the proportional control feedback gain FbpDATA, the change DRtoERR of the gear ratio deviation, the defferential control feedback gain FbdDATA and the integral control feedback compensation quantity FbDATA and using the following expression.

$$FBrto=RtoERR \times FbpDATA+DRtoERR \times FbdDATA+IntgR$$

Then, the routine returns to step S5 in FIG. 2.

At step S5 in FIG. 2, the controller 20 calculates a command gear ratio DsrRTO by adding the desired gear ratio Ratio0 obtained at step S2, the torque shift compensation gear ratio TSrto obtained at step S3 and the feedback compensation quantity FBrto obtained at step S4 (DsrRTO= Ratio0+TSrto+FBrto).

At step S6 the controller 20 calculates a desired number DsrSTP of steps of the stepper motor 17 from the command gear ratio DsrRTO on the basis of a map representative of a relationship between the gear ratio and the number of steps. The calculated desired number DsrSTP is employed for realizing the command gear ratio DsrRTO through driving the stepper motor 17.

At step S7 the controller 20 determines a drive speed of the stepper motor 17 on the basis of the desired number DsrSTP of steps and the oil temperature Temp of the working fluid.

At step S8 controller 20 calculates a command value ASTP according the drive speed.

At step S9 controller 20 outputs the command value ASTP to the stepper motor 17 to drive the stepper motor 17.

Hereinafter, with reference to FIGS. 7 and 8, there will be discussed the setting manner and the calculation manner of the timer Timer employed at step S26 in FIG. 4. This timer Timer determines a time for limiting the increase of the change of the feedback compensation quantity by the integral control.

Figure 7:
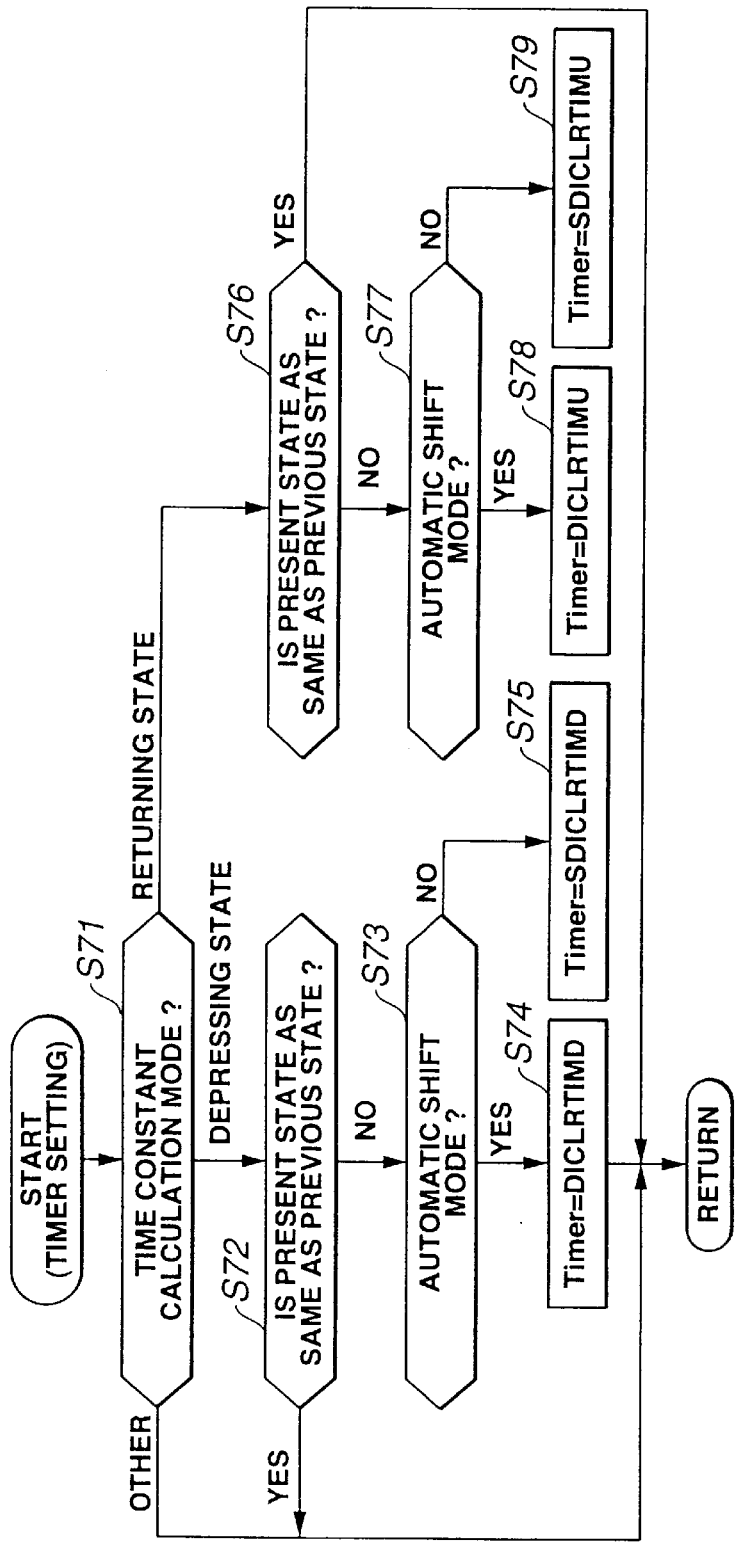
FIG. 7 is a flowchart showing a timer set processing in the feedback compensation quantity calculation program.

The setting of the timer Timer is executed on the basis of a flowchart of FIG. 7.

First, at step S71 the controller 20 determines whether or not the shift time constant calculation mode obtained at step S2 represents a depressing state, a quick depressing state, a slow returning state, a quick returning state or other state such as a depression constant state (APO constant state) as to the accelerator pedal.

When it is determined at step S71 that the accelerator pedal is in the depressing state or the quick depressing state, the routine proceeds from step S71 to step S72 wherein the controller 20 checks the previous time constant calculation mode. More specifically, the controller 20 determines whether the depressing state or the quick depressing state is maintained from the previous detection or is changed at the present detection.

When it is determined at step S71 that the accelerator pedal is in the returning state or the quick returning state, the routine proceeds from step S71 to step S76 wherein the controller 20 checks the previous time constant calculation mode. More specifically, the controller 20 determines whether the returning state or the quick returning state is maintained from the previous detection or is changed at the present detection.

When it is determined at step S71 that the accelerator pedal is in the other state such as the depression quantity maintaining state, or when the determination at step S72 is affirmative, or when the determination at step S76 is affirmative, the timer Timer has been already set. Therefore, without setting the timer Timer, the present routine of FIG. 7 is terminated.

When the determination at step S72 is negative, the routine proceeds to step S73 wherein the controller 20 determines whether the present shift mode is the D-range in the automatic shift mode or not. When the determination at step S73 is affirmative (automatic shift mode), the routine proceeds to step S74 wherein the timer Timer is set at DICLRTIMD (Timer=DICLRTIMD). When the determination at step S73 is negative (M-mode), the routine proceeds to step S75 wherein the timer Timer is set at SDICLRTIMD (Timer=SDICLRTIMD).

In case that the depression mode is the depressing state where the time constant for the downshift is calculated, the shift speed in the automatic shift mode becomes larger than that in the manual shift mode (in the normal traveling condition), the timer Timer is set such that DCLRTIMD<SDICLRTIMD. Therefore, the timer Timer in the automatic shift mode is set at a smaller value as compared with that in the manual shift mode (M-mode).

When the determination at step S76 is negative, the routine proceeds to step S77 wherein the controller 20 determines whether the present shift mode is the D-range in the automatic shift mode or not. When the determination at step S77 is affirmative (automatic shift mode), the routine proceeds to step S78 wherein the timer Timer is set at DICLRTIMU (Timer=DICLRTIMU). When the determination at step S73 is negative (M-mode), the routine proceeds to step S79 wherein the timer Timer is set at SDICLRTIMU (Timer=SDICLRTIMU).

In case that the depression mode is the returning state where the time constant for the upshift is calculated, the shift speed in the automatic shift mode becomes larger than that in the manual shift mode (in the normal traveling condition), the timer Timer is set such that DCLRTIMU<SDICLRTIMU. Therefore, the timer Timer in the automatic shift mode is set small as compared with that in the manual shift mode.

As to comparison between the returning state and the depression state, the timer Timer during the returning state is set samller than the timer Timer during the depressing state such that DICLRTIMU<DICLRTIMU and SDICLRTIMU<SDICLRTIMD.

Figure 8:
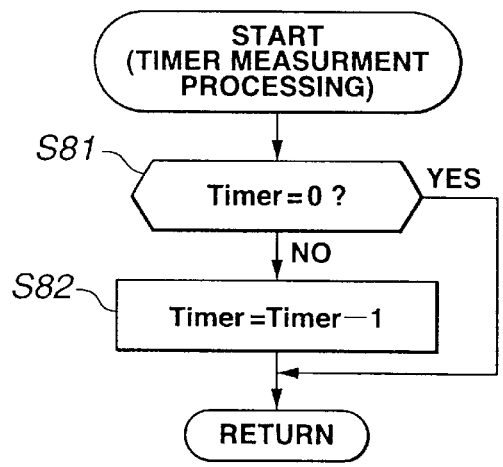
FIG. 8 is a flowchart showing a program of a timer measurement processing.

Consequently, the timer Timer set in the processing from step S71 through step S79 is decremented by 1 at step S82 of the flowchart in FIG. 8 until the controller 20 determines that the timer Timer is zero. By this decrement of the set time Timer, the measurement of the timer Timer is executed.

With the thus arranged embodiment of the shift control system according to the present invention, the torque shift compensation quantity STrto for obtaining the command gear ratio DsrRTO by adding to the desired gear ratio Ratio0 is set as follows:

That is, as explained with reference to FIG. 10, when the selection of the gear ratio close to the lowest side gear ratio, which corresponds to a value larger than α1 in FIG. 10, is forbidden under the condition that the vehicle is in the automatic shift range (D-range) except for the vehicle starting, the torque shift compensation quantity in the manual shift mode (M-mode) is set at a value which is smaller than the torque shift compensation quantity in the automatic shift rang (D-range) within the high-side gear ratio region, which is smaller than α1 in FIG. 10. In FIG. 10, a continuous line shows the torque shift compensation quantity in the automatic shift range, and a broken line shows the torque shift compensation quantity in the manual shift mode. This arrangement is achieved by executing the processing of steps S14 through S16 in FIG. 3.

Therefore, when the gear ratio is in the high-side gear ratio region except for the gear ratio close to the lowest side gear ratio, that is, when in the normal gear ratio region, the torque shift compensation quantity in M-mode is set to be smaller than the torque shift compensation quantity in D-range. Therefore, it becomes possible to prevent the torque shift compensation quantity in M-mode employed in the normal transmission region from becoming excessively large. This solves a problem that the actual gear ratio is shifted to the higher side as compared with the desired gear ratio due to the excessive increase of the torque shift compensation quantity.

Further, with the thus arranged embodiment, the difference between the torque shift compensation quantity in M/T-mode and the torque shift compensation quantity in D-range is increased as the gear ratio is varied to the lower side gear ratio, as shown in FIG. 10. This arrangement is executed in correspond to the increasing change of the storage of the feedback compensation quantity in D-range, and achieves the above-discussed advantages toward the low-side gear ratio.

Furthermore, the embodiment according to the present invention discloses an arrangement that the shift control system of the toroidal CVT 10 allows selecting all of the gear ratios including the lowest side gear ratio even in D-range except for starting the vehicle as shown in FIG. 11, and that the torque shift compensation quantity in M-mode is set at a value smaller than the torque shift compensation quantity in D-range throughout the whole gear ratio region as shown in FIG. 11. This arrangement enables the torque shift compensation quantity in M-mode to take a proper value throughout all of the practical gear ratio region without taking an excessive value, and this arrangement solves the problem that the actual gear ratio is shifted to the higher side smaller than the desired gear ratio due to the excessive increase of the torque shift compensation quantity.

Further, as shown in FIG. 11, the magnitude relationship between the torque shift compensation quantities in M-mode and in D-range is determined such that the difference between the torque shift quantities in M-mode and in D-range are increased as the gear ratio in the normal transmission region which is smaller than $\alpha 1$ in FIG. 11 approaches the low-side gear ratio, and that the torque shift compensation quantity is decreased when the gear ratio is in the lowest side gear ratio region which is larger than $\alpha 1$ in FIG. 11. This arrangement is highly matched with a fact that the accumulation of the feedback compensation quantity increases as the gear ratio approaches the low-side gear ratio in the automatic shift range when the gear ratio is in the normal gear ratio region except for the low-side gear ratio region close to the lowest side gear ratio. Therefore this arrangement certainly achieves the above discussed advantages throughout the normal gear ratio region.

Further, when the gear ratio is close to the lowest side gear ratio, the following advantages are obtained by lowering the torque shift compensation quantity in the automatic shift range (D-range).

That is, the feedback gain of the mechanical feedback system is set to take a large value when the gear ratio takes a value close to the lowest side gear ratio in order to prevent the power-roller supporting member from colliding with the tilt stopper. However, if the torque shift compensation quantity in the gear ratio region close to the lowest side gear ratio is set at the large value in addition to the large value setting of the feedback gain of the mechanical feedback system, there will cause a problem that the shifting to the lowest side gear ratio may be prevented by the large value setting of the torque shift compensation quantity.

In contrast to this, by decreasing the torque shift compensation quantity during the automatic shift range (D-range) in the gear ratio region close to the lowest side gear ratio as shown in FIG. 1, in accordance with the present invention, it becomes possible to prevent the above-problem that the shifting to the lowest side transmission is disabled.

Even if the torque shift compensation quantity is set as shown in one of FIGS. 10 and 11, in case that the difference between the torque shift quantities in M-mode and D-range is increased according the increase of the transmission input torque Tin as shown in FIG. 12, the above-discussed advantages are certainly obtained throughout the whole transmission input torque in correspond to the increase of the accumulation of the feedback compensation quantity in D-range according to the increase of the transmission input torque Tin. This solves the problem that the actual gear ratio is excessively set at a high side gear ratio as compared with the desired gear ratio in M-mode due to the excessively large setting of the torque shift compensation quantity.

Further, with the embodiment according to the present invention, when the command gear ratio DsrRTO is obtained by adding the desired gear ratio Ratio0, the torque shift compensation quantity TSrto and the feedback compensation quantity DsrRTO, as shown by the processing at step S5 in FIG. 2, and when the switching between the automatic shift range (D-range) and the other ranges including M-mode is executed as shown by the processing from step S29 through step S32 in FIG. 4, the command gear ratio DsrRTO is obtained by adding the difference $\Delta$TSrto (corresponding to the processing at step S30) caused by this switching to the difference IntgR of the integral control (corresponding to the processing at step S32). In this arrangement, the feedback compensation quantity IntgR is due to the integral control executed according to the deviation between the actual gear ratio Ratio and the desired gear ratio Ratio0, and is included in the feedback compensation quantity FBrto employed in the PID control as shown in step S33 of FIG. 4. This arrangement ensures the following advantages.

Figure 13:
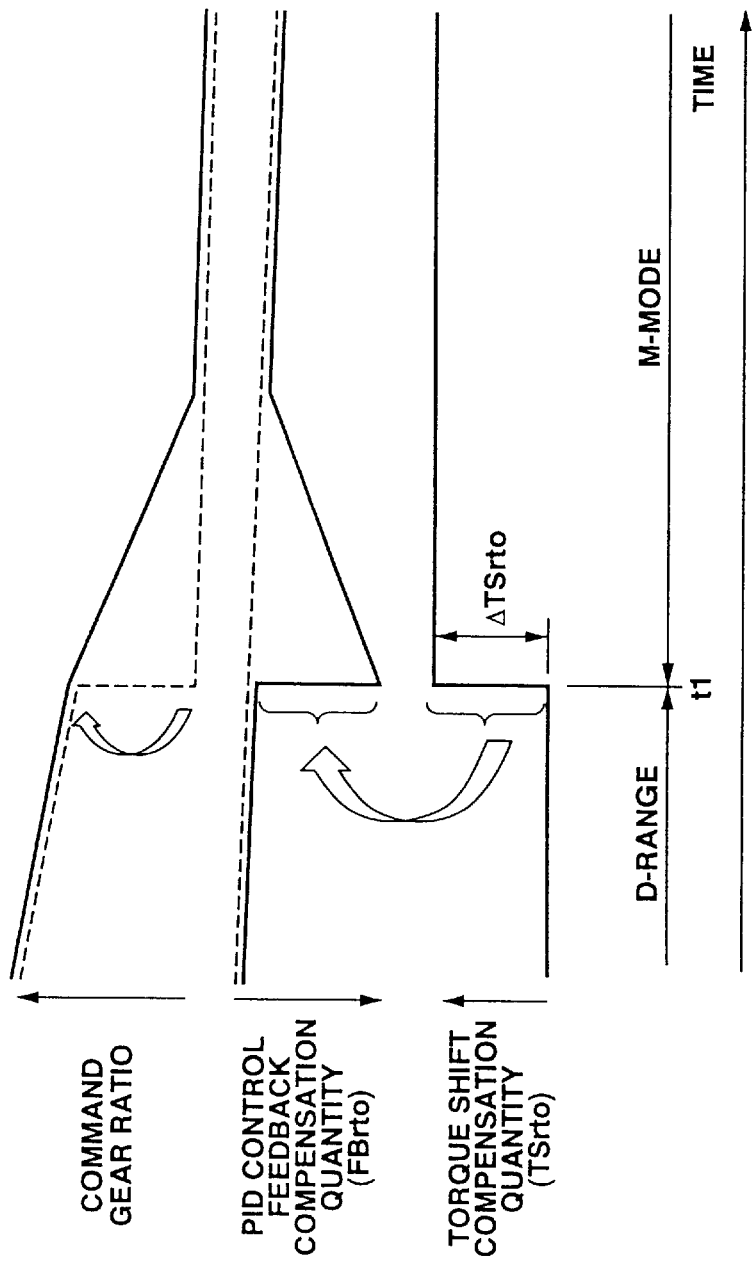
FIG. 13 is a time chart showing an operation of the shift torque compensation apparatus according to the present invention at a moment that a shift mode is switched from D-range to M-mode.

FIG. 13 shows an operation time chart in case that the switching from D-range to M-mode is executed at a moment t1 and that the command gear ratio DsrRTO causes the difference as shown by a broken line due to the difference $\Delta$TSrto.

In the embodiment according to the present invention, by adding the difference $\Delta$TSrto of the torque shift compensation quantities at the switching moment t1 to the feedback compensation quantity of the integral control, the feedback compensation quantity FBrto of the PID control is varied from the broken line to the continuous line. Therefore it becomes possible that the command gear ratio DsrRTO obtained by adding the feedback compensation quantity FBrto is smoothly and in time-series varied from the pre-switching gear ratio to the post-switching gear ratio as shown by a continuous line of the command gear ratio DsrRTO. This prevents the generation of a shock during the range switching.

This application is based on Japanese Patent Application No. 2001-399340 filed on Dec. 28, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiment described above will occur to those skilled in the art, in light of the above teaching.

The scope of the invention is defined with reference to the following claims.

What is claimed is:

1. A shift control system of a toroidal continuously variable transmission (toroidal CVT) for a vehicle, comprising:
   a controller configured,
      to calculate a command gear ratio by adding a desired gear ratio and a torque shift compensation quantity for compensating a difference between the desired gear ratio and an actual gear ratio which difference is generated by a shifting operation of the toroidal CVT, and
      to set a magnitude of the torque shift compensation quantity employed in an automatic shift range to be larger than a magnitude of the torque shift compensation quantity employed in other shift range except for the automatic shift range when the actual gear ratio is in a first gear ratio region except for a second gear ratio region including a largest gear ratio.

2. The shift control system as claimed in claim 1, wherein the controller is further configured to prohibit selecting a gear ratio within the second gear ratio region when the selected shift range is an automatic shift range and when the vehicle is not in a vehicle starting state.

3. The shift control system as claimed in claim 1, wherein the controller is further configured to increase a difference between the torque shift compensation quantity in the automatic shift range and the torque shift compensation quantity in other shift range as the gear ratio approaches the largest gear ratio.

4. The shift control system as claimed in claim 1, wherein the controller is further configured to allow selecting a gear ratio within the second gear ratio region when the selected shift range is an automatic shift range.

5. The shift control system as claimed in claim 4, wherein the controller is further configured to set the magnitude of the torque shift compensation quantity in the automatic shift range at a value larger than the magnitude of the torque shift compensation quantity in other shift range except for the automatic shift range.

6. The shift control system as claimed in claim 5, wherein the controller is further configured to increase a difference between the magnitude of the torque shift compensation quantity in the automatic shift range and the magnitude of the torque shift compensation quantity in other shift range as the gear ratio approaches the smallest gear ratio when the actual gear ratio is in the first gear ratio region, and to decrease the magnitude of the torque shift compensation quantity in the automatic shift range when the actual gear ratio is in the second gear ratio region.

7. The shift control system as claimed in claim 1, wherein the controller is further configured to increase a difference between the magnitude of the torque shift compensation quantity in the automatic shift range and the magnitude of the torque shift compensation quantity in the other range as an input torque of the toroidal CVT increases.

8. The shift control system as claimed in claim 1, wherein the controller is further configured to calculate the command gear ratio by adding the desired gear ratio, the torque shift compensation quantity and a feedback compensation quantity for integral control executed according to a deviation between the actual gear ratio and the desired gear ratio, and to calculate the feedback compensation quantity by further adding a change of the torque shift compensation quantity caused by a switching between the automatic shift range and other shift range.

9. A shift control system of a toroidal continuously variable transmission (toroidal CVT) for a vehicle, comprising:
a controller configured,
to calculate a command gear ratio by adding a desired gear ratio, a torque shift compensation quantity and a feedback compensation quantity, the torque shift compensation quantity being employed for compensating a difference between the desired gear ratio and an actual gear ratio which difference is generated by a shifting operation of the toroidal CVT, the feedback compensation quantity being obtained by integral control executed according to a deviation between the actual gear ratio and the desired gear ratio,
to set the torque shift compensation quantity employed in an automatic shift range to be different from the torque shift compensation quantity employed in other shift range except for the automatic shift range when the actual gear ratio is in a first gear ratio region except for a second gear ratio region including a largest gear ratio, and
to increase the feedback compensation quantity by a change of the torque shift compensation quantity caused by a switching between the automatic shift range and the other shift range when the switch is executed.

10. A shift control system of a toroidal continuously variable transmission (toroidal CVT) for a vehicle, comprising:
a transmission rotation speed detector that detects an input rotation speed and the output rotation speed of the toroidal CVT;
an accelerator opening detector that detects a depression degree of an accelerator pedal;
a vehicle speed detector that detects a vehicle speed;
a shift range detector that detects a selected shift range of the toroidal CVT;
a shift control device that operates the toroidal CVT according to a command gear ratio;
a controller connected to the transmission rotation speed detector, the accelerator opening detector, a vehicle speed detector, the shift range detector and the shift control device, the controller being configured,
to calculate an actual gear ratio of the toroidal CVT from the input and output rotation speeds of the toroidal CVT,
to calculate a desired gear ratio based on a shift map from the depression degree of the accelerator pedal and the vehicle speed;
to calculate the command gear ratio by adding the desired gear ratio and a torque shift compensation quantity for compensating a difference between the desired gear ratio and the actual gear ratio which difference is generated by a shifting operation of the toroidal CVT,
to set such that a magnitude of a first torque shift compensation quantity is greater than a magnitude of a second torque shift compensation quantity when the actual gear ratio is in a first gear ratio region except for a second gear ratio region including a largest gear ratio, the first torque shift compensation quantity being employed as the torque shift compensation quantity when the selected shift range is an automatic shift range, the second torque shift compensation quantity being employed as the torque shift compensation quantity when the selected shift range is other shift range except for the automatic shift range.

11. A method of setting a torque shift compensation quantity employed for compensating a difference between a desired gear ratio and an actual gear ratio which difference is generated by a shifting operation of a toroidal continuously variable transmission (toroidal CVT) for a vehicle, the method comprising the steps of:
calculating a command gear ratio by adding the desired gear ratio and the torque shift compensation quantity; and
setting a magnitude of the torque shift compensation quantity employed in an automatic shift range to be larger than a magnitude of the torque shift compensation quantity employed in other shift range except for the automatic shift range when the actual gear ratio is in a first gear ratio region except for a second gear ratio region including a largest gear ratio.

* * * * *